Figure 2:
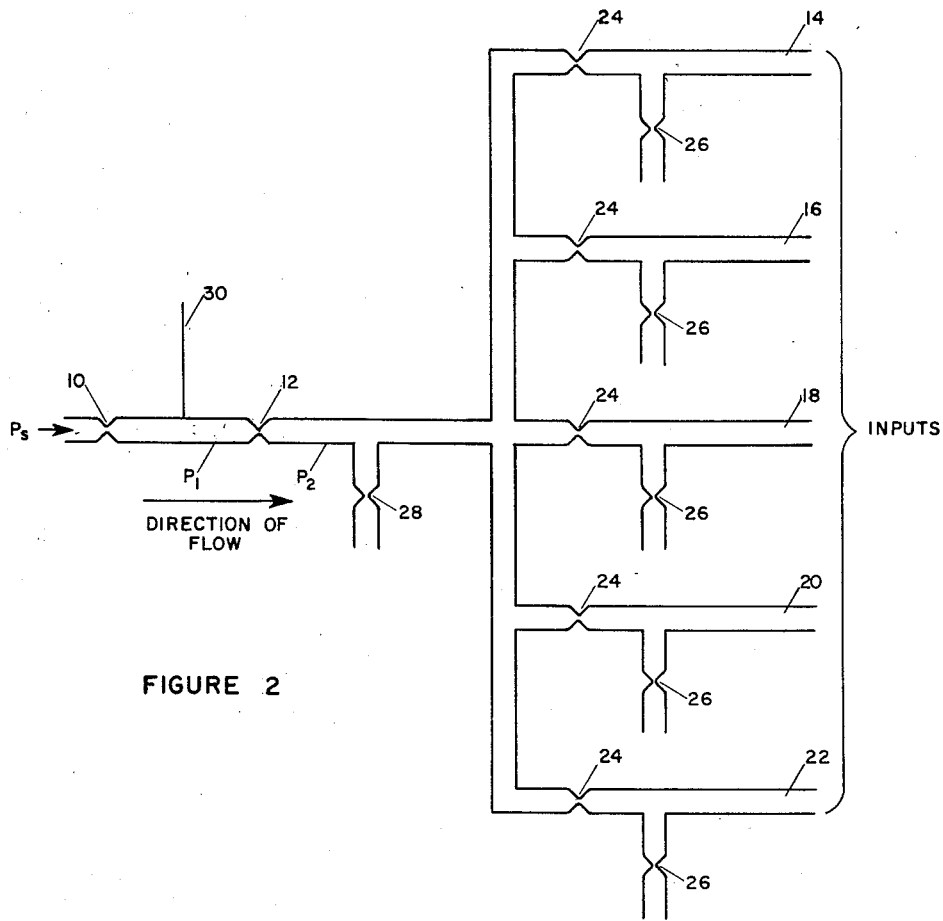

Dec. 18, 1962   H. E. RIORDAN   3,068,880
PNEUMATIC DIODE
Filed Dec. 28, 1961

HUGH E. RIORDAN
INVENTOR

BY *Sal A. Giarratana*
*George B. Oujevolk*
ATTORNEY

United States Patent Office 3,068,880
Patented Dec. 18, 1962

3,068,880
PNEUMATIC DIODE
Hugh E. Riordan, Wyckoff, N.J., assignor to General Precision Inc., Little Falls, N.J., a corporation of Delaware
Filed Dec. 28, 1961, Ser. No. 162,727
6 Claims. (Cl. 137—82)

The present invention relates to diodes and more particularly to a pneumatic diode that can be used in the pneumatic instrumentation of digital computing functions.

Broadly speaking, a diode is a circuit element having the following properties: (1) unidirectional conduction of an applied signal, and (2) capability of providing a switching function when subjected to a controllable bias. These two diode properties can be provided by a pneumatic diode employing simple orifices and taking advantage of the fact that when a simple orifice is subjected to a pressure differential such that the velocity of flow through the throat of the orifice is less than the speed of sound in the fluid medium being employed, a rise in pressure on the downstream side of the orifice will also result in a pressure rise on the upstream side provided that there is some flow restriction in the line upstream of the orifice to enable the pressure to build up. However, if the pressure ratio across the orifice is such that sonic flow is present in the orifice, a rise in pressure on the downstream side of the orifice will not be accompanied by a rise in pressure on the upstream side. Similarly, if the flow through an orifice is subsonic, a pressure change on the upstream side will result in a similar pressure change on the downstream side, provided there is a suitable restriction downstream of the orifice. However, a pressure change on the upstream side will result in a pressure change on the downstream side if the flow through the orifice is sonic.

In accordance with one embodiment of the present invention this phenomenon is utilized to provide a pneumatic diode "and" gate by coupling a plurality of pneumatic inputs to the downstream side of an orifice having a sonic flow therethrough and so designed that pulses appearing at each input increases the pressure on the downstream side of the orifice. When all but one of the inputs are simultaneously pulsed, the pressure on the downstream side is raised to very close to the critical point at which the flow through the orifice will change from sonic to subsonic. Consequently the input pulses do not result in a pressure rise on the upstream side of the orifice because the flow therethrough is still sonic. However, when all of the inputs are pulsed simultaneously, the pressure downstream of the orifice is raised higher than critical so that the flow through the orifice is changed to subsonic. This results in a pressure rise on the upstream side of the orifice when all of the inputs are pulsed simultaneously.

Accordingly, it is one object of the invention to provide a pneumatic diode.

It is another object of the invention to couple simple orifices in a manner to achieve two diode properties, namely, the unidirectional conduction of an applied signal, and the capability of providing a switching function when subjected to a controllable bias.

It is a further object of the invention to utilize the phenomenon of critical flow to produce diode-like properties in a simple orifice arrangement which can be used to instrument digital logic functions pneumatically.

It is a still further object of the invention to provide a pneumatic diode which is simple in operating principle and construction, has no moving parts, and has very high response speed.

Figure 1:
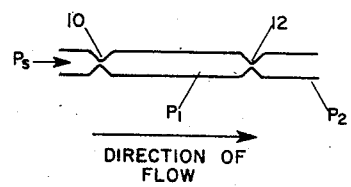

Other objects and features of novelty of the present invention will be specifically pointed out or will otherwise become apparent when referring, for a better understanding of the invention, to the following description taken in conjunction with the accompanying drawings, wherein;

FIG. 1 is a schematic view of a pneumatic diode and;
FIG. 2 is a schematic view of the pneumatic instrumentation of a diode "and" gate.

Referring to FIG. 1, there is shown schematically a pair of spaced orifices 10 and 12 with a compressible fluid, such as air for example, flowing therethrough from left to right so that the orifice 10 may be considered as acting as a supply orifice and the orifice 12 as a diode orifice. The fluid is delivered to the supply orifice 10 at a pressure $Ps$ and experiences a pressure drop across the orifice resulting in a lower pressure $P1$ on the downstream side of the orifice. Similarly, a pressure drop is experienced across the diode orifice 12 so that the downstream pressure $P2$ is less than the pressure $P1$ on the upstream side of the orifice 12. If the pressure differential across each of the orifices is initially in what may be called the subcritical region so that the velocity of flow through each of the orifices is less than the speed of sound, an increase in the pressure $P2$ will result in an increase in the pressure $P1$. However, it the pressure $Ps$ is increased sufficiently or the pressure $P2$ decreased sufficiently to increase the pressure differential across each of the orifices so that the flow therethrough is greater than the speed of sound, a rise in the pressure $P2$ will not be accompanied by a rise in the pressure $P1$ as long as the increase in the pressure $P2$ is not sufficient to change the flow through the orifices from sonic to subsonic.

Referring to FIG. 2 this phenomenon can be taken advantage of to provide a pneumatic diode "and" gate by coupling a plurality of inputs 14–22 to the downstream side of the diode orifice 12. Each of the inputs has orifices 24 and 26 associated therewith so as to isolate the inputs from one another, and an orifice 28 also may be coupled to the downstream side of the diode orifice 12 to function as the equivalent of a summing resistance in an electrical circuit. The flow of fluid is from the power supply $Ps$ at the left through the orifices 10 and 12 and then out through each of the orifices 24 and 26, a portion of the fluid also passing out through the orifice 28. The pressures $Ps$, $P1$ and $P2$ are such that the flow through the orifices 10 and 12 is sonic and the flow through the orifices 24, 26 and 28 is subsonic. If air is the working medium, the throats of the orifices are such that in the absence of an input signal, $P1$ is less than $0.5\ Ps$, and $P1 = 2[P2 + (n-1)KS]$ where $S$ is the standard pulse amplitude, $n$ is the number of input channels (in this case 5) and $K$ is the summing coefficient for the network of orifices 24, 26 and 28. Thus when $n-1$ inputs (4) are pulsed simultaneously, the downstream to upstream pressure ratio is very close to but less than 0.53, which is the critical ratio for air. Therefore with $n-1$ or fewer inputs pulsed simultaneously, the flow through the orifices 10 and 12 remains sonic and the pulsing of the inputs does not result in an increase in the pressure $P1$ between the orifices 10 and 12. However, when all of the inputs are pulsed simultaneously, the pressure $P2$ downstream of the orifice 12 is increased sufficiently to raise the downstream to upstream ratio of the orifice 12 above the critical ratio of 0.53 so as to change the flow through the orifice to subsonic. Consequently, a pressure rise slightly smaller than $KS$ will appear at the output 30 between the diodes 10 and 12 when all of the inputs are pulsed simultaneously.

Each of the inputs 14–22 is connected between the orifices 24–26 associated therewith so that when it is pulsed it increases the pressure between the orifices which results in an increase in the pressure P2 on the upstream side of each of the orifices 24. Since the flow through each of the orifices 24 is subsonic, an increase in the pressure on the downstream side of the orifices 24 will produce the above mentioned increase in pressure on the upstream side of the orifices.

However, instead of connecting each of the inputs 14–22 as just described to increase the pressure between the orifices 24 and 26 when pulsed, the pressure between the orifices also can be increased in other ways, such as by merely reducing the size of the orifices 26. For example, each of the orifices 26 could have a plunger associated therewith which is shiftable between first and second positions, reducing the size of the orifice when shifted to its second position. With this arrangement a rise in pressure would appear in the output 30 when all of the plungers are shifted to their second positions simultaneously.

There are also a number of ways in which the output 30 of the circuit illustrated in FIG. 2 can be employed. For example, the output 30 could be connected by suitable piping to one side of a double acting cylinder bellows or other pneumatic-mechanical actuator so that the pressure P1 normally acts on this side of the cylinder. The pressure P1 from a second circuit identical to that illustrated in FIG. 2 could be similarly piped to the opposite side of the piston so that the piston is normally balanced. With this arrangement, when all of the inputs of one of the two circuits is pulsed simultaneously, the pressure P1 in the output 30 associated therewith will rise, as previously described, to shift the piston and thus accomplish a mechanical function. Alternatively, the pressure rise appearing at 30 could be led to other pneumatic logic circuits employing fixed orifices or moving elements and so to form a part of the input to a larger pneumatic computing or logic system.

While it will be apparent that the embodiments of the invention described above are well calculated to fulfill the objects of the invention, it will be appreciated that many changes, revisions, and modifications can be made without departing from the scope of the invention as defined by the following claims.

What is claimed is:

1. A pneumatic diode comprising an orifice having fluid flowing therethrough at a speed greater than the speed of sound, and a plurality of input means coupled to the downstream side of said orifice, each of said input means increasing the downstream pressure a predetermined amount when pulsed, said downstream pressure increasing to a level above the point at which the flow of fluid through said orifice changes from sonic to subsonic when more than one of said input means are pulsed simultaneously.

2. A pneumatic diode comprising an orifice having fluid flowing therethrough at a speed greater than the speed of sound, and a plurality of inputs coupled to the downstream side of said orifice to increase the downstream pressure when pulsed, each of said input means comprising a pair of spaced orifices coupled to the downstream side of said first orifice and having said fluid flowing therethrough at a speed less than the speed of sound, and an input connected between said pair of orifices to increase the pressure therebetween when pulsed, the pressure downstream of said first mentioned orifice increasing to a level above the point at which the flow of fluid through the first mentioned orifice changes from sonic to subsonic when more than one of said inputs are pulsed simultaneously.

3. The invention as defined in claim 2 including a summing orifice coupled to the downstream side of the first mentioned orifice upstream of said pairs of orifices, a portion of said pressurized fluid flowing therethrough at a speed less than the speed of sound.

4. A pneumatic diode "and" gate comprising a supply orifice having fluid flowing therethrough at a speed greater than the speed of sound, a diode orifice downstream of said supply orifice having said fluid flowing therethrough at a velocity greater than the speed of sound, a plurality of first input orifices coupled in parallel to the downstream side of said diode orifice and having said pressurized fluid flowing therethrough at a velocity less than the speed of sound, a second input orifice coupled to each of said first input orifices downstream thereof and having said fluid flowing therethrough at a velocity less than the speed of sound, input means for selectively increasing the pressure between each pair of first and second input orifices, and output means responsive to a rise in pressure between said supply and diode orifices, the pressure downstream of said diode orifice increasing to a level above the point at which the velocity of the fluid flowing through the diode orifice drops below the speed of sound when more than one of said input means are pulsed simultaneously.

5. The invention as defined in claim 4 including a summing orifice positioned downstream of said diode orifice and upstream of said plurality of first input orifices and having said fluid flowing therethrough at a velocity less than the speed of sound.

6. The invention as defined in claim 4 wherein the pressure downstream of said diode orifice rises to a level above said point when all of said inputs are pulsed simultaneously and is at a level below said point when less than all of said inputs are pulsed simultaneously.

References Cited in the file of this patent

UNITED STATES PATENTS 3,032,664    Rowe _____ May 1, 1962

OTHER REFERENCES

"Mechanics of Fluids" (Irving H. Shames), Published by McGraw-Hill Book Company, 1958. (Pages 14.45–14.54 relied on. Copy in Div. 39. Class 137, subclass 608).